United States Patent Office 3,114,735
Patented Dec. 17, 1963

3,114,735
POLYESTER-URETHANE CASTINGS
Kenneth A. Pigott, New Martinsville, W. Va., assignor to Mobay Chemical Company, Pittsburgh, Pa., a corporation of Delaware
No Drawing. Filed May 11, 1959, Ser. No. 812,082
6 Claims. (Cl. 260—75)

This invention relates generally to the production of polyurethane plastics and, more particularly to the production of polyurethane plastics having improved physical properties at elevated temperatures.

It is known to produce polyurethane plastics from diisocyanate-modified polyesters having terminal —NCO groups, organic diisocyanates and either trifunctional or difunctional cross-linking agents such as 1,4-butanediol or trimethylol propane. It has heretofore been considered essential in the production of polyurethane plastics by a casting technique to have an excess of —NCO groups present in the reaction mixture throughout the preparation of substantially homogeneous polyurethane plastics. In these heretofore known processes, substantially linear polyesters containing terminal hydroxyl groups are reacted with a quantity of an organic diisocyanate in excess of the amount required to react with the hydroxyl end groups of the polyester and the resulting —NCO terminated product and excess organic diisocyanate is subsequently mixed with either a dihydric alcohol, a trihydric alcohol or a diamine, cast in a mold and cured at an elevated temperature. The resulting substantially homogeneous polyurethane plastics have found many commercial applications due to their advantageous physical properties. They have only been entirely suitable at temperatures below about 100° C. in air, however, because of a decrease in physical properties at higher temperatures. In many commercial applications, it is important to be able to employ substantially homogeneous polyurethane plastics at elevated temperatures of about 150° C. or higher. No previously known substantially homogeneous polyurethane plastics would withstand temperatures above about 100° C. for any appreciable length of time without serious impairment of the advantageous physical properties for which they have become noted.

It is an object of this invention to provide substantially homogeneous polyurethane plastics which have improved physical properties. Another object of this invention is to provide substantially homogeneous polyurethane plastics which have improved ability to withstand stress at relatively high temperatures. Still another object of this invention is to provide substantially homogeneous polyurethane plastics which have improved physical properties at temperatures above about 100° C. Another object of this invention is to provide a process for the preparation of substantially homogeneous polyurethane plastics which have improved physical properties.

The foregoing objects and others which will become apparent from the following description are accomplished in accordance with the invention, generally speaking, by providing polyurethane plastics obtained from the reaction of an hydroxyl polyester, an organic diisocyanate and a trifunctional hydroxyl or amino terminated compound or mixtures of said trifunctional compound with less than an equivalent amount of a difunctional compound having either terminal hydroxyl or amino groups in such proportions that the total hydroxyl and amino radicals exceeds isocyanate radicals present in the final reaction mixture. Thus, this invention contemplates polyurethane plastics which have improved properties at elevated temperatures which are obtained from the reaction of an hydroxyl polyester with an excess of an organic diisocyanate in a first step to prepare a diisocyanate-modified polyester having terminal —NCO groups which is thereafter reacted with a critical amount of a monomeric trihydric alcohol or mixture thereof with less than an equivalent amount of a monomeric dihydric alcohol in such proportions that an —OH to —NCO ratio of more than 1:1 and not more than 1.1:1 is present in the final reaction mixture.

In general, the proportion of the reactants should be adjusted so that an —OH to —NCO ratio of more than 1:1 and not greater than about 1.1:1 is obtained in the final reaction mixture containing the diisocyanate-modified polyester, the excess organic diisocyanate and the trifunctional compound or mixture thereof with the bifunctional compound. It is to be understood that the —OH to —NCO ratio referred to herein takes into account the hydroxyl groups of the polyester as well as those of the trihydric alcohol and dihydric alcohol. In a preferred embodiment of the present invention, a substantially homogeneous polyurethane plastic is obtained by reacting an organic diisocyanate with an hydroxyl polyester, said diisocyanate being present in amounts within the range of from about .4 to about 8.0 mols per mol of hydroxyl polyester, to obtain a prepolymer comprising a mixture of an —NCO terminated diisocyanate-modified polyester and excess organic diisocyanate which is subsequently reacted with from about .5 mol to about 4.6 mols of a trihydric alcohol or a mixture thereof with from about 3.4 to about 0 mol of a dihydric alcohol, the molar ratios being such that the —OH to —NCO ratio is more than 1:1 but not more than about 1.1:1. More particularly, the molar ratios of the polyester, the organic diisocyanate and the trifunctional or difunctional compounds are controlled within these ranges so that the ratio of active hydrogen-containing groups to —NCO is more than 1:1 and not more than 1.1:1. Consequently, if one employs 8 mols of organic diisocyanate per mol of polyester in the preparation of the —NCO terminated initial product, then about 3.4 mols of difunctional compound and about 2.4 mols of trifunctional compound are needed to provide an active hydrogen group to —NCO ratio in the range of more than 1:1 to 1.1:1, taking into account the hydroxyl groups of the polyester as well as the active hydrogen containing groups of the trifunctional and difunctional compounds employed in the second step. The proportion of organic diisocyanate employed per mol of polyester may therefore be varied over a wide range as illustrated above. It is, however, preferred to employ about 3 mols of organic diisocyanate per mol of polyester in the preparation of the initial product and employ a mixture of about 1 mol of the difunctional compound and about 0.8 mol of the trifunctional compound in the cross-linking step. Other suitable formulations for the preparation of the high load bearing elastomers of the invention are given in Table I based on alcohols for example.

TABLE I

| OH/NCO ratio | Mols diisocyanate/mol polyester | Mols of dihydric alcohol | Mols of trihydric alcohol |
|---|---|---|---|
| 1.01 to 1 | 2.4 | 0.6 | 0.55 |
| 1.01 to 1 | 3.2 | 1.05 | 0.8 |
| 1.01 to 1 | 3.2 | 0.0 | 1.5 |
| 1.1 to 1 | 3.2 | 0.0 | 1.57 |
| 1.004 to 1 | 6.0 | 2.4 | 1.75 |
| 1.01 to 1 | 8.0 | 3.4 | 2.45 |
| 1.006 to 1 | 8.0 | 0.0 | 4.7 |

As is evident from the foregoing table, the cross-linking agent may be entirely a trifunctional compound. However, one may not use only the difunctional compound as a cross-linking agent and obtain the satisfactory properties provided by these new products. Mixtures of difunctional compounds and trifunctional compounds may only be used where an excess of the trifunctional compound is present based on the functional groups of the two types of components.

Any suitable hydroxyl polyester may be used in the process of this invention. Hydroxyl polyesters obtained from organic dicarboxylic acids and dihydric alcohols are preferred. Any suitable dicarboxylic acid may be used, such as, for example, adipic acid, succinic acid, sebacic acid and the like. Any suitable dihydric alcohol, such as, for example, ethylene glycol, propylene glycol, butylene glycol, amylene glycol, diethylene glycol, p-phenylene bis($\beta$-hydroxy ethyl ether) and the like may be used. Of course, it is necessary to employ an excess of the dihydric alcohol in the condensation leading to the preparation of the hydroxyl polyester in order to have terminal hydroxyl groups in the product. Hydroxyl polyesters having a molecular weight above about 1000 and preferably within the range of about 1500 to about 4000 give the most satisfactory products. The polyester may be substantially linear (i.e. have two hydroxyl groups) and preferably has an acid number not substantially greater than about 1 and an —OH number within the range of about 30 to about 115.

Any suitable organic diisocyanate may be used, such as, for example, 4,4'-diphenyl methane diisocyanate, 4,4'-diphenyl diisocyanate, 1,5-naphthalene diisocyanate, 2,4-tolylene diisocyanate, 2,6-tolylene diisocyanate, and mixtures thereof, p-phenylene diisocyanate, m-phenylene diisocyanate, 3,4'-dimethyl, 4,4'-diphenyl methane diisocyanate, 3,4'-bitolylene diisocyanate and the like.

Any suitable cross-linking agent of the class more particularly described above may be used. Thus, trihydric alcohols, such as, for example, trimethylol propane, glycerol, 1,3,6-hexanetriol, trimethylol ethane, and the like, as well as triethanol amine and the like may be used. Trifunctional compounds containing amino groups, such as, for example, 1,2,3-triamino propane, and the like may be used. Dihydric alcohols, such as, for example, 1,4-butylene glycol, ethylene glycol, 1,3-propane diol, and the like, as well as diamines such as ethylene diamine and the like may be used as difunctional cross-linking agents.

In accordance with the process of the present invention, the organic diisocyanate-modified polyester is prepared in a first step to yield a reaction mixture containing the diisocyanate-modified polyester and excess organic diisocyanate. This reaction mixture is then mixed with the cross-linking agent and cast into a mold where it is cured at any suitable temperature and preferably at a temperature within the range of about 100 to about 150° C., the curing time being somewhat dependent on the temperature at which curing is effected. Most preferably, the final mixture of components is cast into a mold and cured at a temperature of about 110° C. for about 24 hours.

The products obtained in accordance with the process of the present invention may be used in the production of gears, molded diaphragms, check valve buttons, valve seals, O-rings, and other cast or molded polyurethane parts in accordance with heretofore known processes at elevated temperatures up to about 250° C.

The invention is further illustrated by the following examples in which the parts are by weight:

*Example 1*

A polyester having a molecular weight of about 2000, an —OH number of about 56, and an acid number not substantially greater than about 1 is prepared by condensing one mol of adipic acid with about 1.09 mols of ethylene glycol at a temperature of about 200° C. for about 35 hours. The hydroxyl polyester is dehydrated by heating it to a temperature of about 125° C. for about 1 hour after completion of the reaction. About 100 parts of the hydroxyl polyester are then mixed with about 40 parts of 4,4'-diphenyl methane diisocyanate at a temperature of about 125° C. to prepare an isocyanate-modified polyester having about 6.5% —NCO available for further reaction. To this isocyanate-modified polyester is added about 5.4 parts by weight of trimethylol propane and 4.5 parts of 1,4-butylene glycol with stirring and the mixture is cast in a mold and cured by heating to a temperature of about 110° C. for about 24 hours. The resulting substantially homogeneous polyurethane plastic obtained exhibits the following physical characteristics:

Tensile strength (lbs./sq. in.) _____ 3700
Elongation at break (percent) _____ 300
Modulus, 100% (lbs./sq. in.) _____ 350
Hardness (Shore A) _____ 70
Compression deflection at 10 percent deflection (lbs./sq. in.):
  At 25° C_____ 110
  At 100° C_____ 100
  At 150° C_____ 100
  At 200° C_____ 100

Replacing the mixture of trimethylol propane and 1,4-butylene glycol in the foregoing example with 9.0 parts of 1,4-butylene glycol yielded a casting having the following physical properties:

Tensile strength (lbs./sq. in.) _____ 6000
Elongation at break (percent) _____ 500
Modulus, 100% (lbs./sq. in.) _____ 600
Hardness (Shore A) _____ 75
Compression deflection at 10 percent deflection (lbs./sq. in.):
  At 25° C_____ 200
  At 100° C_____ 80
  At 150° C_____ 50
  At 170° C_____ 20

Replacing the 5.4 parts trimethylol propane in the foregoing example with 4.5 parts of trimethylol propane yielded a casting having the following physical properties:

Tensile strength (lbs./sq. in.) _____ 3500
Elongation at break_____ 350
Modulus, 100% (lbs./sq. in.) _____ 1200
Hardness (Shore A) _____ 75
Compression deflection at 10 percent deflection (lbs./sq. in.):
  At 25° C_____ 110
  At 100° C_____ 100
  At 150° C_____ 80
  At 170° C_____ 20

*Example 2*

To the isocyanate modified polyester, prepared in accordance with the procedure of Example 1, is added about 10.0 parts of trimethylol propane with stirring and the mixture is cast in a mold and cured by heating to a temperature of about 110° C. for about 24 hours, the resulting substantially homogeneous polyurethane plastic obtained exhibits the following characteristics:

Tensile strength (lbs./sq. in.) _____ 1500
Elongation break (percent) _____ 160
Modulus, 100% (lbs./sq. in.) _____ 1200
Hardness (Shore A) _____ 75

It is understood that any suitable polyester, as more particularly defined above, could have been substituted in the foregoing examples with equally satisfactory results. Further, any of the hereinbefore defined organic diisocyanates, carboxylic acids, difunctional compounds and/or trifunctional compounds could have been employed with equally satisfactory results in the foregoing examples following the procedure outlined.

Although the invention has been described in considerable detail in the foregoing for the purpose of illustration, it is to be understood that such detail is solely for this purpose and that variations can be made therein by those skilled in the art without departing from the spirit and scope of the invention except as is set forth in the claims.

What is claimed is:

1. A process for the preparation of a polyurethane which comprises:

reacting a diisocyanate modified polyester with an active hydrogen containing compound wherein the ratio of active hydrogen containing groups to —NCO groups is more than 1 and up to about 1.1, said active hydrogen containing compound selected from the group consisting of alcohols and amines having from 2 to 3 functional groups as the only groups reactive with the isocyanate; said diisocyanate modified polyester prepared by reacting with an hydroxyl polyester from about 2.4 mols to about 8 mols of an organic diisocyanate per mol of said hydroxyl polyester.

2. The process of claim 1 wherein said active hydrogen containing compound is a polyhydric alcohol comprising from about .5 mol to about 4.6 mols of a trihydric alcohol and from about 0 mol to 3.4 mols of a dihydric alcohol in such proportions that an excess of a trihydric alcohol is present over the dihydric alcohol.

3. The process of claim 2 wherein said trihydric alcohol is trimethylolpropane, said dihydric alcohol is 1,4-butylene glycol and said organic diisocyanate is 4,4'-diphenyl methane diisocyanate.

4. A polyurethane prepared by a process which comprises:

reacting a diisocyanate modified polyester with an active hydrogen containing compound wherein the ratio of active hydrogen containing groups to —NCO groups is more than 1 and up to about 1.1, said active hydrogen containing compound selected from the group consisting of alcohols and amines having from 2 to 3 functional groups as the only groups reactive with the isocyanate; said diisocyanate modified polyester prepared by reacting with an hydroxyl polyester from about 2.4 mols to about 8 mols of an organic diisocyanate per mol of said hydroxyl polyester.

5. The composition of claim 4 wherein said active hydrogen containing compound is a polyhydric alcohol comprising from about .5 mol to about 4.6 mols of a trihydric alcohol and from about 0 mol to 3.4 mols of a dihydric alcohol in such proportion that an excess of a trihydric alcohol is present over the dihydric alcohol.

6. The compositon of claim 5 wherein said trihydric alcohol is trimethylolpropane, said dihydric alcohol is 1,4-butylene glycol, and said organic diisocyanate is 4,4'-diphenyl methane diisocyanate.

References Cited in the file of this patent

UNITED STATES PATENTS

| | | |
|---|---|---|
| 2,621,166 | Schmidt | Dec. 9, 1952 |
| 2,753,319 | Brockway | July 3, 1956 |
| 2,981,712 | Harper | Apr. 25, 1961 |

FOREIGN PATENTS

| | | |
|---|---|---|
| 831,772 | Germany | Feb. 18, 1952 |
| 1,005,721 | Germany | Apr. 4, 1957 |